United States Patent [19]

Smith

[11] 4,271,593

[45] Jun. 9, 1981

[54] WIRE CUTTER

[76] Inventor: Samuel C. Smith, 210 Hartman Rd., Newton Centre, Mass. 02159

[21] Appl. No.: 47,791

[22] Filed: Jun. 12, 1979

[51] Int. Cl.³ .............................................. B26B 13/00
[52] U.S. Cl. ...................................................... 30/233
[58] Field of Search .................. 30/233, 226, 244, 261

[56] References Cited

U.S. PATENT DOCUMENTS

| | | | |
|---|---|---|---|
| 217,583 | 7/1879 | Cannon | 30/261 X |
| 1,492,855 | 5/1924 | Linn | 30/233 |
| 2,249,515 | 7/1941 | Carroll | 30/226 |
| 3,333,338 | 8/1967 | Burns | 30/233 |
| 3,370,353 | 2/1968 | Weissman | 30/233 |

*Primary Examiner*—Jimmy C. Peters

[57] ABSTRACT

A wire cutter having a pair of partially overlapping blade-shaped jaws pivotally connected, each jaw having an operating handle, a pin in one jaw blade being received in a slot in the other jaw blade to limit the pivotal movement, a plurality of holes in said jaw blades, said holes being countersunk in the outer surface of one of said blades, said holes being in alignment when said handles are in the maximum open position for the insertion of a wire to be cut, said holes in non-alignment when said handles are squeezed, thereby permitting said blades to cut wire, and a spring between said handles to return said handles to the open position.

2 Claims, 2 Drawing Figures

WIRE CUTTER

BACKGROUND OF THE INVENTION

1. Field of the Invention

This invention pertains to wire cutting devices and, in particular, to hand-held and hand-operable wire cutting tools. The principles of the invention may also be implemented in automatic wire cutting machinery.

2. Description of the Prior Art

Although many types of wire cutting devices are known in the art, the structural design of these tools is such that they cannot be counted on to render a round and burrless wire end after cutting. There are many cases, particularly in the field of electronics where it is important to retain the physical shape of the cut wire. Existing wire cutters squeeze and flatten the end of the wire as they cut the wire. The consequence is having to file and dress the end before, for example, it can be threaded through a circuit board. One type of cutter contains a circular cutting function on the edge of the blades, but this is of not much help since there is no way to control the wire size to be cut, thereby limiting the points of contact between the cutting edges and the wire. An important factor in obtaining round and burrless cuts is the ratio of circumferential contact to applied force. A maximum of circumferential contact is necessary for effectiveness. When a conventional pair of wire (or lead) cutters is used, circumferential contact between the wire and cutter is at two points. Therefore, the exerted force is concentrated at these two points. Hence the reason for flattening. The opposite or best condition is for effecting full circumferential contact. In this instance, the force is almost evenly distributed. One hundred percent circumferential force can never be attained nor is it necessary. Provided circumferential contact is not less than 50% when force is applied, virtually no deformation will take place and the end of the wire will be burrless. A built prototype substantiated the reliability of the apparatus and confirmed its need.

In the prior patent art, similar type tools are disclosed in U.S. Pat. Nos. 2,560,313 for a bolt cutter; U.S. Pat. No. 2,527,735 for a rivet cutter and U.S. Pat. No. 1,767,077 for a wire cutter. The closest prior art known to the inventor is disclosed in U.S. Design Pat. No. 226,548 for a cutting tool. The present invention is designed to provide a much simplified and very inexpensive alternative to this cutting tool. The present invention is also easier to sharpen and smaller and lighter in weight than the cutting tool of U.S. Pat. No. D226,548. This improves handling, accuracy and reliability, especially in electronic applications. Furthermore, it appears that the wire cutter of the present invention will also be superior in performance.

Accordingly, it is the primary object of this invention to provide a wire or lead cutter suitable for cutting wires from 1/64" to ⅛" (or longer) diameter and leaving the ends round and burrless, in which case no further attention is needed before threading the wire through holes with limited clearance.

It is a further object of this invention to provide a wire or lead cutter with easy means of inserting the wire leads in predetermined holes for cutting application. Said means include a specially designed spring and guide or limit pin which ensure perfect alignment of the countersunk holes at all time.

It is a still further object of this invention to provide a wire (or Lead) cutting device of perfectly aligned holes in increments of 1/64 of an inch, the smallest being 1/32 inch and the holes being countersunk on one side of the tool to ease threading.

It is a specific object of this invention to provide a simple and economical wire (or lead) cutting device designed to effect a clean cut free of burrs and without alterations to the roundness of the wire (or lead) end.

The wire cutting device of this invention comprises a pair of pivotally connected jaws each having an operating handle, a portion of one jaw overlapping a portion of the other, the overlapping portions being essentially a pair of flat, toolsteel blades, one of which has a guide pin which rides in a channel in the other, thus limiting the pivotal movement of the jaws. Each jaw blade has one or more holes drilled therein such that the holes of each blade coincide when the handles are in the extreme open position, the upper side of one blade having countersunk holes to permit the easy insertion of a length of wire. The holes correspond to approximate wire gauge diameters. When the handles are closed, the jaw blades cut an inserted wire at the point where it intersects the inner mating surfaces of the jaw blades. At this point the holes no longer coincide, but are displaced completely from one another. A spring in the handles together with the guide pin in its channel regulate the full open and closed position of the aligned cutting holes of the tool when the handles are squeezed or relaxed.

DESCRIPTION OF THE PREFERRED EMBODIMENT

Figure 1:
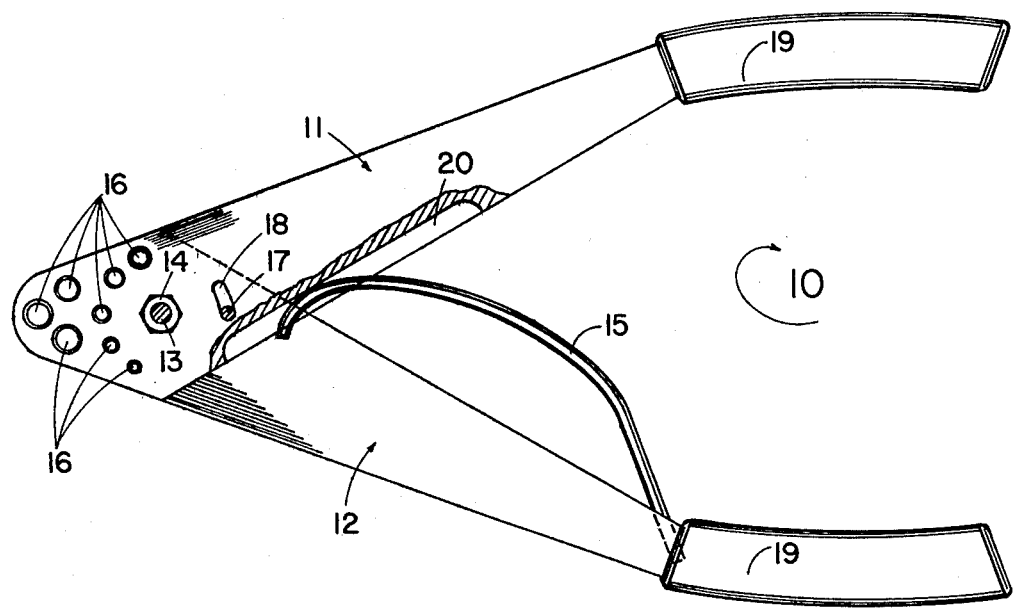
FIG. 1 is a top plan view of the wire cutter of the present invention.
Figure 2:
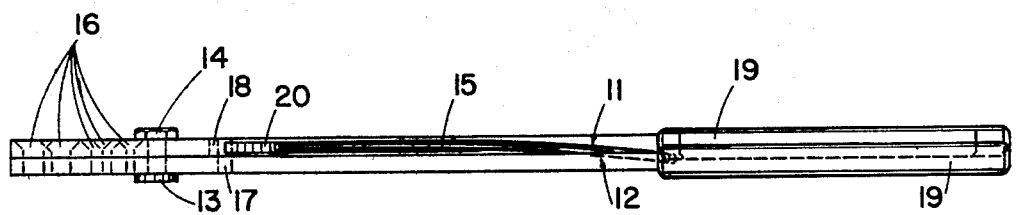
FIG. 2 is a side view of the wire cutter of FIG. 1.

Referring now to the drawings, FIG. 1 illustrates a top plan view of the wire cutter 10 of the present invention. Wire cutter 10 includes a pair of pivotally connected jaw blades 11, 12, each having an operating handle 19, a portion of one jaw blade 11, as shown in FIG. 1, the overlapping portions being essentially a pair of flat tool steel blades. Blades 11, 12 are pivotally secured together by screw 13 which has a slide fit in blade 12 and screws into threaded blade 11. After proper adjustment, lock nut 14 locks the assembly in operational position.

Pin 17 is press-fitted into blade 12 and is designed to ride in a curved slot 18 in blade 11. The center of the radius of slot 18 is the center of screw 13. Pin 17 and slot 18 serve to limit the travel of the jaw blades 11, 12 and provide an alignment means, as described hereinafter.

Overlapping jaw blades 11 and 12 have a plurality of holes 16 drilled therethrough, with the holes countersunk on the upper side of blade 11. Holes 16 are positioned such that when handles 19 are in the full open position, the holes 16 on jaw blades 11, 12 will coincide in perfect alignment. The countersunk holes 16 on blade 11 permit the easy insertion of a length of wire through holes 16 in blades 11, 12. For purposes of wire cutter 10 and the perfect alignment of holes 16, pin 17 and slot 18 are utilized. Slot 18 is positioned such that when pin 17 is at the extreme right (or in the drawing, lower) side of slot 18, holes 16 will be in the full open position. The small arcuate length of slot 18 also serves to limit the pivotal motion of jaw blades 11, 12, when handles 18 are squeezed to the full close position. This limit of travel is slightly greater than the distance required to position holes 16 such that no portion of a hole 16 in blade 11 overlaps a hole 16 in blade 12. Thus pin 17 and slot 18 limit the pivotal travel of jaw blades 11, 12 for the opening and closing of holes 16, which provides the cutting action. At the full open position, with all holes 16 in full alignment, pin 17 is forced against one end of slot 18. Holes 16 are at least fully closed when pin 17 is forced against the other end of slot 18. Additionally, the controlled arcuate travel of jaw blades 11, 12 provides a long and reliable life for the blades 11, 12, reducing fatigue and the resulting loss of efficiency.

A plurality of holes 16 are provided to accommodate a variety of wire sizes while maintaining maximum circumferential contact. In the intended use for cutting wires used in electronic assemblies, holes 16 would have diameters ranging from 1/32" to ⅛", with increments of 1/64" between hole sizes.

The smooth and efficient operation of wire cutter 10 is provided by spring 15 which has the bow-shape illustrated in FIG. 1. Spring 15 has one end secured to handle 19 of blade 12. The other end, which curves upwardly and inwardly, rides in a smooth groove 20 in the inner side of handle 19 of blade 11, groove 20 being on the inner side of handle 9 and is coated with a lubricant such as Teflon (Trademark). Spring 15 provides a tension to maintain handles 19 in the full open position and holes 16 in jaw blades 11, 12 in perfect alignment prior to the cutting.

In making wire cutter 10, the two arms are placed in the assembled position and clamped with blade 11 upward. The indicated holes of varying sizes are drilled through blades 11 and 12, being countersunk in blade 11. Following the drilling operation, the individual blades are hardened and ground. After hardening but before grinding, groove 20 is coated.

Sleeves may be provided on handles 19 as illustrated in FIG. 1.

To use wire cutter 10, a wire of the desired size is inserted in the smallest hole 16 which will receive it. Handles 19 are then squeezed to cut the wire. When the force is released, the wire is withdrawn and is ready for use. Device 10 provides a wire cutter which makes a smooth and precisely even cut without flattening, burring or otherwise deforming the end of the wire.

I claim:

1. A wire cutter for cutting wire smoothly and without burrs comprising:
   a pair of pivotally connected jaws, each of said jaws having an operating handle;
   a portion of one jaw overlapping a portion of the other, said overlapping portions having a flat blade-shaped structure;
   at least one hole through the overlapping portion of each of said jaws spaced forward of and apart from said pivotal connection, the hole on the outer surface of one of said jaws being countersunk;
   a pin press-fitted in one of said blade-shaped jaws spaced rearward of and apart from said pivotal connection;
   an arcuate slot in the other of said blade-shaped jaws spaced rearward of and apart from said pivotal connection to receive said pin;
   said pin and said slot defining the range of the pivotal movement of said blade-shaped jaws, such that when said pin is stopped at one end of said slot, said holes in each of said blades overlap in complete alignment and when said pin is at the other end of said slot, said holes are in complete misalignment;
   a handle extending rearward from each of said blade-shaped jaws;
   a curved spring attached to one of said handles and extending toward the overlapping portions to the other of said handles;
   a groove cut into the interior side of the other of said handles to receive the curved end of said spring;
   said groove being coated with a lubricant;
   said spring serving to maintain said handles in the maximum open position permitted by said pin and said slot, at which position said holes in said jaw blades coincide in alignment, and after closing of said handles and release of pressure returning said handles to said maximum open position.

2. A wire cutter comprising a pair of pivotally connected jaws each having a flat blade-shaped portion overlapping a similar portion of the other and each of the jaws having an integral operating handle, each of the blade-shaped portions being formed with a plurality of apertures having diameters differing from one another by an increment of 1/64 inch, corresponding apertures of the same size in the two jaws being in register in a starting relative position of the jaws means for locating the jaws in the relative position including a pin fixedly extending from one of the jaws, an arcuate slot entered by the pin and having an end surface which when engaged by the pin locates the jaws in the relative position and an opposite end for limiting the relative motion of the jaws to a position in which the corresponding apertures in the two jaws are completely out of register when the opposite end is engaged by the pin and a bow shaped spring fixedly secured to and extending from one of the handles toward the overlapping portions and into a slot formed in the other handle.

* * * * *